W. SHAW.
TRACTION VEHICLE.
APPLICATION FILED APR. 1, 1915.
1,199,503.
Patented Sept. 26, 1916.
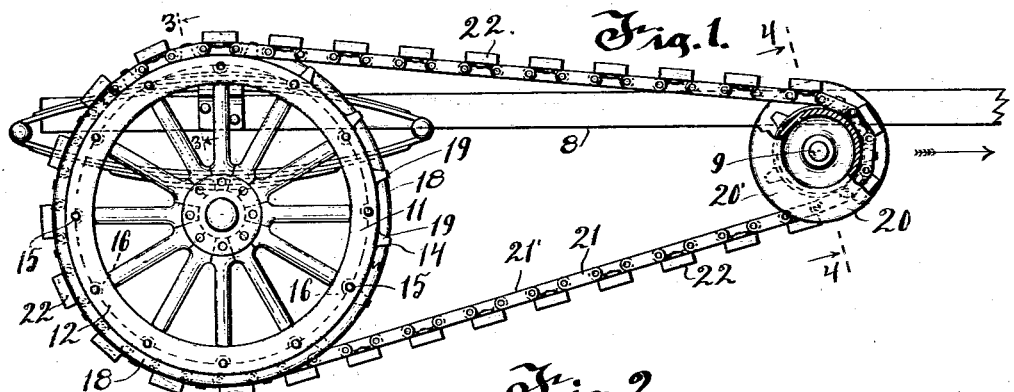
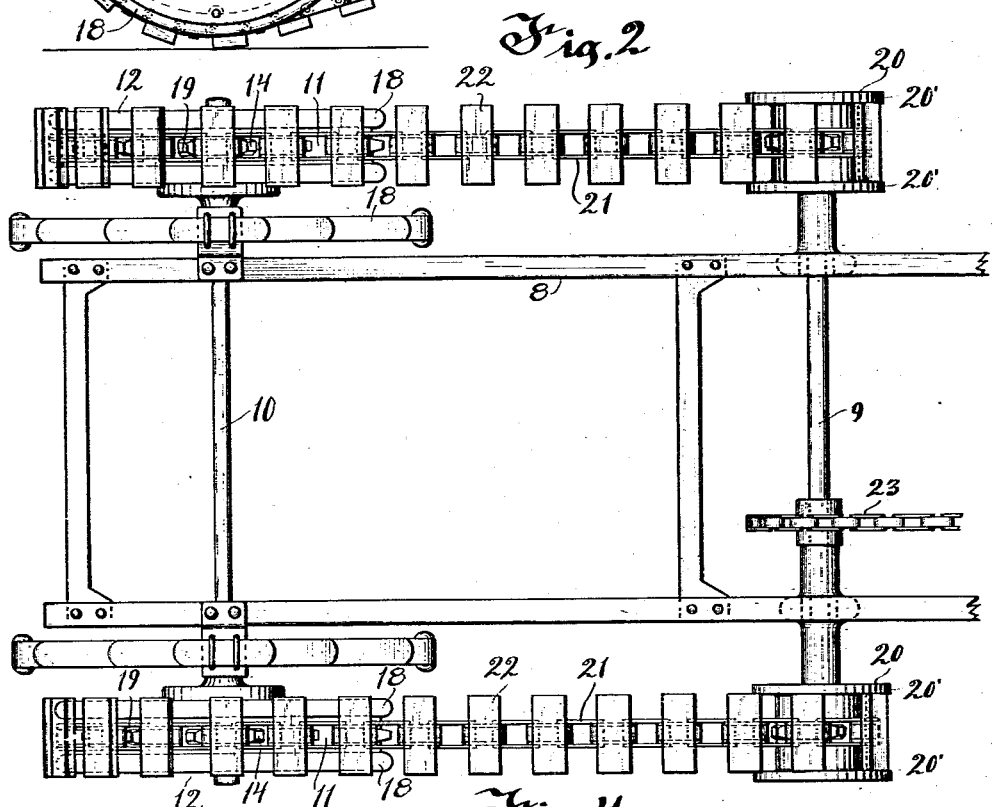
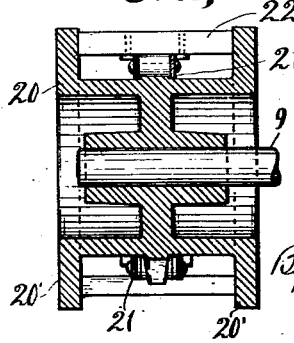
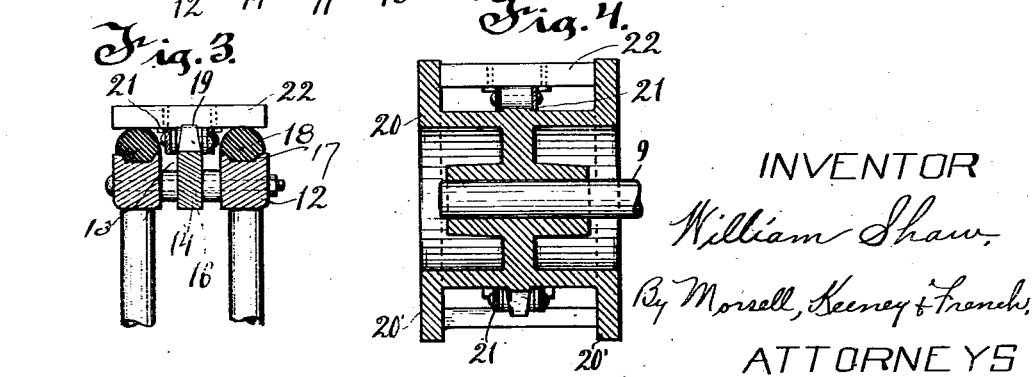
INVENTOR
William Shaw,
By Morsell, Keeney & French,
ATTORNEYS

UNITED STATES PATENT OFFICE.

WILLIAM SHAW, OF WEST ALLIS, WISCONSIN.

TRACTION-VEHICLE.

1,199,503.   Specification of Letters Patent.   Patented Sept. 26, 1916.

Application filed April 1, 1915. Serial No. 18,485.

*To all whom it may concern:*

Be it known that I, WILLIAM SHAW, a citizen of the United States, and resident of West Allis, in the county of Milwaukee and State of Wisconsin, have invented new and useful Improvements in Traction-Vehicles, of which the following is a description, reference being had to the accompanying drawings, which are a part of this specification.

This invention relates to improvements in traction vehicles.

It is one of the objects of the present invention to provide a traction vehicle in which the application of traction power is applied directly to the road traveled over in a manner more efficient than heretofore in use.

A further object of the invention is to provide a traction vehicle which is adapted to travel over rough roads and which will easily climb out of comparatively deep depressions or hollows in the road without undue strain upon the parts.

A further object of the invention is to provide a traction vehicle which while presenting comparatively a large bearing surface on the road may be easily turned or steered within a short distance.

A further object of the invention is to provide a traction vehicle in which rubber tires may be used for the traction wheels in such a manner that the said tires will not directly contact with the road traveled over and the wear of the tires will thereby be greatly prolonged.

A further object of the invention is to provide a traction vehicle which is of simple construction, is strong and durable and is well adapted for the purpose described.

With the above and other objects in view the invention consists of the improved traction vehicle and its parts and combinations as set forth in the claims, and all equivalents thereof.

In the accompanying drawing in which the same reference characters indicate the same parts in all of the views: Figure 1 is a side view of the rear portion of the improved traction vehicle, portions being broken away to show other parts in the rear thereof; Fig. 2 is a top view of the parts shown in Fig. 1; Fig. 3 is an enlarged transverse sectional detail view taken on line 3—3 of Fig. 1; and Fig. 4 is a similar view taken on line 4—4 of Fig. 1.

Referring to the drawing the numeral 8 indicates a portion of the frame of the improved vehicle, 9 the transversely extending driving shaft, 10 the rear axle and 11 the traction wheels journaled on the opposite ends thereof. The traction wheel rims 12 are preferably formed in two parts spaced as indicated by the numeral 13 to receive the sprocket wheels or rims 14 mounted therebetween. The sprocket wheels are fastened to the traction wheel by bolts 15 which pass through the rims of the traction wheels and eyed lugs 16 of the sprocket rims. The sprocket wheels or rims are held medially between the rims. While this is the preferred form for fastening the sprocket wheels to the traction wheels it is to be understood that the parts may be fastened together in many other ways without departing from the spirit and scope of the invention. The wheel rims on the opposite side edge portions of the sprocket wheels are also provided with circumferential grooves 17 to receive tires 18, preferably formed of rubber and which are mounted on the rims and extend into the recesses. These tires project from the rims approximately the same distance as the sprocket teeth 19 of the sprocket wheel 14. As the two rims are spaced from the sprocket rims dirt or other foreign material carried upon the chains can easily work out between the spaces and thus prevent clogging up the wheels.

The opposite end portions of the driving shaft 9 have flanged sprocket wheels 20 mounted thereon which are connected to the sprocket wheels 14 by traction sprocket chains 21. Alternate links of the traction chains on their outer sides are provided with transversely extending traction blocks 22 which travel with the chains and rest upon the rubber tires of the traction wheels when in engagement therewith. The traction blocks rest upon the road while engaging the lower peripheries of the traction wheels and form a supplemental road bed upon which the traction wheels are rolled by the pull of the traction chains. As the blocks are of comparatively large size they serve to better support the load and provide a more efficient traction means than the ordinary traction wheels.

The flanged sprocket wheels 20 are of less diameter than the traction wheels and are located on a higher plane than said traction wheels and consequently the lower portions 21' of the traction chains which extend from the lower peripheries of the traction wheels 12 to the lower peripheries of the driving sprocket wheels 20 incline upwardly, forwardly with relation to the direction of travel of the vehicle. These upwardly inclined chain portions are of great importance in increasing the traction portions of the chain and blocks in propelling the vehicle out of ruts and in traveling over rough roads. A further advantage in the inclined chain portions resides in the fact that the inclination of the traction chains permit the vehicle to be easily steered or turned. The flanges 20' of the sprocket wheels 20 serve to prevent the traction sprocket chains from accidentally disengaging the sprocket wheels.

The driving shaft is connected to the engine or other propelling means by a sprocket chain and wheel connection 23 or in any other manner desired.

By having the traction chains engage the traction wheels at their peripheries greater leverage is obtained in the transmission of power than in the ordinary manner heretofore in use.

From the foregoing description it will be seen that the traction vehicle is of very simple construction and is well adapted for the purpose desired.

It will be observed, that the bases of the teeth on the sprocket wheels 14 are flush with the sides of the body-portion thereof, and that the openings in the chain which engages over the teeth are sufficiently wide to allow of an inward movement of the chain when the rubber tires 18 are depressed under a load. As plainly seen in Fig. 3 of the drawing, if a load should be placed upon the block 22, the rubber tires would be depressed and the chain would slide inwardly over the tooth. This movement will occur when the blocks 22 are in contact with the ground and thus form a resilient support for the load.

What I claim as my invention is:

1. A traction vehicle, comprising a vehicle frame, an axle connected thereto, a traction wheel mounted on the axle and provided with a resilient supporting periphery and a driving periphery spaced from each other, a driving means mounted on the frame in advance of the traction wheel, and an endless transmission means engaging said driving means and extending around the peripheral portions of the traction wheel, the lower portion of said transmission means being inclined in an upward and forward direction with relation to the direction of travel of the vehicle.

2. A traction vehicle, comprising a vehicle frame, an axle connected thereto, a traction wheel mounted on the axle provided with a resilient supporting periphery and a toothed peripheral rim spaced from each other, a driving means mounted on the frame and consisting in part of a sprocket wheel in advance of the traction wheel and an endless transmission chain engaged by the toothed rim and the sprocket wheel, the lower portion of said chain being inclined upwardly and forwardly with relation to the direction of travel of the vehicle.

3. A traction vehicle, comprising a vehicle frame, an axle connected thereto, a traction wheel mounted on the axle and provided with a resilient supporting periphery and a toothed peripheral rim spaced from each other, a driving means mounted on the frame and consisting in part of a sprocket wheel in advance of the traction wheel, an endless transmission chain engaged by the toothed rim and said sprocket wheel, the lower portion being inclined in an upwardly and forwardly direction with relation to the direction of travel of the vehicle, and traction blocks mounted in spaced relation on said chain to engage said resilient supporting periphery and in position to engage the road to be traveled over.

4. A traction vehicle, comprising a vehicle frame, an axle connected thereto, a traction wheel mounted on the axle and provided with a resilient supporting periphery and a toothed rim spaced from each other, a driving shaft mounted on the frame and having a sprocket wheel mounted thereon in advance of said traction wheel, an endless transmission chain engaging the toothed periphery of the traction wheel and the sprocket wheel, the lower portion of said chain being inclined upwardly and forwardly with relation to the direction of the travel of the vehicle, and traction blocks mounted in spaced relation on said chain and extending transverse thereof and in a position to engage said resilient supporting periphery and to rest upon the road to be traveled over.

5. A traction vehicle, comprising a vehicle frame, an axle connected thereto, a traction wheel journaled on the axle and having a toothed peripheral rim, tires mounted on the rim on the opposite sides of the teeth thereof, a driving shaft mounted on the frame and having a sprocket wheel mounted thereon, in advance of the traction wheel, an endless transmission chain engaging the teeth of the traction wheel and the sprocket wheel and extending between the tires, the lower portion of said chain being inclined in an upward and forward direction with relation to the direction of travel of the vehicle, and traction blocks mounted in spaced relation on said chain and extending transversely with relation thereto and in position to rest upon the road traveled over, the said blocks in passing around said traction wheel engaging and riding on the tires thereof.

6. A traction vehicle, comprisng a vehicle frame, an axle connected thereto, a traction wheel journaled on the axle and having a toothed peripheral rim, tires mounted on the rim on the opposite sides of the teeth thereof, a driving shaft mounted on the frame and having a sprocket wheel mounted thereon, in advance of the traction wheel, said sprocket wheel having side flanges, an endless transmission chain engaging the teeth of the traction wheel and the sprocket wheel and extending between the tires, the lower portion of said chain being inclined in an upward and forward direction with relation to the direction of travel of the vehicle, and traction blocks mounted in spaced relation on said chain and extending transversely with relation thereto and in position to rest upon the road traveled over, the said blocks in passing around said traction wheel engaging and riding on the tires thereof.

7. A traction vehicle, comprising a vehicle frame, an axle connected thereto, traction wheels having two part rims journaled on the opposite end portions of the axle and provided with circumferential recesses, said rims being spaced apart, toothed rims interposed between the traction wheel rims and spaced therefrom, tires mounted on the traction wheel rims and extending into the recesses on each side of each toothed rim, a driving shaft mounted on the frame and having flanged sprocket wheels mounted on its opposite end portions, endless transmission chains engaging the teeth of the toothed rims and the sprocket wheels and extending between the tires, the lower portions of the chains being inclined in an upward and forward direction, and traction blocks mounted in spaced relation on said chain and extending transversely with relation thereto and in position to rest upon the road traveled over, the said blocks in passing around said traction wheel engaging and riding on the tires thereof.

8. A traction vehicle, comprising a frame mounted upon traction wheels, and an endless transmission means for driving said wheels, each of said traction wheels being provided with separate peripheral portions spaced from each other, one of which is engaged by the endless transmission means for driving the vehicle and the other being resilient and engaging a different portion of said transmission means to form a traction support for said wheels.

9. A traction vehicle, comprising a frame mounted upon traction wheels, and a transmission means for driving said wheels, each of said wheels being provided with separate peripheral means spaced from each other for driving and supporting the same, and said transmission means being formed for inward movement on said peripheral driving means when said peripheral supporting means is depressed under a load.

In testimony whereof, I affix my signature.

WILLIAM SHAW.